US012196776B2

(12) United States Patent
Hiyoshi

(10) Patent No.: US 12,196,776 B2
(45) Date of Patent: Jan. 14, 2025

(54) INERTIAL SENSOR DEVICE

(71) Applicant: SEIKO EPSON CORPORATION, Tokyo (JP)

(72) Inventor: Yasunori Hiyoshi, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 125 days.

(21) Appl. No.: 18/086,975

(22) Filed: Dec. 22, 2022

(65) Prior Publication Data

US 2023/0204623 A1 Jun. 29, 2023

(30) Foreign Application Priority Data

Dec. 24, 2021 (JP) ................................. 2021-210444

(51) Int. Cl.
*G01P 15/16* (2013.01)

(52) U.S. Cl.
CPC .................................. *G01P 15/16* (2013.01)

(58) Field of Classification Search
CPC .......... G01P 15/16; G01P 15/18; G01P 1/023; G01C 21/16; G01C 21/183
USPC ......................................................... 324/162
See application file for complete search history.

(56) References Cited

U.S. PATENT DOCUMENTS

| 2018/0180441 A1* | 6/2018 | Mizuochi | G01C 21/16 |
| 2018/0180442 A1* | 6/2018 | Uchida | G01P 7/00 |
| 2019/0277880 A1* | 9/2019 | Kinoshita | G01S 19/47 |
| 2021/0270635 A1 | 9/2021 | Takeda et al. | |

FOREIGN PATENT DOCUMENTS

| WO | 2020/045099 A1 | 3/2020 |
| WO | 2021/152884 A1 | 8/2021 |

* cited by examiner

*Primary Examiner* — Christopher P McAndrew
(74) *Attorney, Agent, or Firm* — Rankin, Hill & Clark LLP

(57) ABSTRACT

The inertial sensor device is an inertial sensor device including a plurality of inertial measurement modules, and includes: a clocking unit; a storage unit configured to store detection data from each of the plurality of inertial measurement modules in association with a time point of the clocking unit; and a synthesis processing unit configured to calculate interpolation data at a predetermined time point based on the detection data from each of the plurality of inertial measurement modules at at least two time points, and synthesize, using the interpolation data for each of the plurality of inertial measurement modules, output data at the predetermined time point.

6 Claims, 11 Drawing Sheets

INERTIAL SENSOR DEVICE

The present application is based on, and claims priority from JP Application Serial Number 2021-210444, filed on Dec. 24, 2021, the disclosure of which is hereby incorporated by reference herein in its entirety.

BACKGROUND

1. Technical Field

The present disclosure relates to an inertial sensor device.

2. Related Art

There is known an inertial sensor device including an inertial sensor module having a plurality of inertial sensors such as an acceleration sensor and an angular velocity sensor. The inertial sensor device is incorporated in various electronic devices or machines, or mounted on a moving body such as an automobile, to be used for monitoring an inertial amount such as an angular velocity or an acceleration. The inertial sensor device is also applied to a system for monitoring a structure such as a bridge or an elevated track.

For example, WO 2020/045099 discloses a technique of improving detection accuracy by providing a plurality of sensors represented by an inertial measurement unit (IMU) or the like, and synthesizing observation values from the plurality of sensors.

However, in WO 2020/045099, when a deviation occurs in detection timings of the plurality of sensors, an S/N ratio deteriorates, which may lead to a decrease in detection accuracy. This is a knowledge based on a result of verification by the inventors, and is particularly noticeable when detection data from the sensor is a digital signal, because the detection data is discretized on a time axis.

That is, there has been a demand for an inertial sensor device capable of appropriately synthesizing detection data from a plurality of sensors and having high detection accuracy.

SUMMARY

An inertial sensor device according to an aspect of the present application is an inertial sensor device including a plurality of inertial measurement modules, and includes: a clocking unit; a storage unit configured to store detection data from each of the plurality of inertial measurement modules in association with a time point of the clocking unit; and a synthesis processing unit configured to calculate interpolation data at a predetermined time point based on the detection data from each of the plurality of inertial measurement modules of at least two time points, and synthesize, using the interpolation data for each of the plurality of inertial measurement modules, output data at the predetermined time point.

An inertial sensor device according to an aspect of the present application is an inertial sensor device including a plurality of inertial measurement modules having a first inertial measurement module, and includes: a clocking unit; a storage unit configured to store detection data from each of the plurality of inertial measurement modules in association with a time point of the clocking unit; and a synthesis processing unit configured to calculate interpolation data at a predetermined time point based on the detection data from having a first inertial measurement module of at least two time points, and synthesize, using the interpolation data for the first inertial measurement module, output data at the predetermined time point.

DESCRIPTION OF EXEMPLARY EMBODIMENTS

First Embodiment

Outline of Inertial Sensor Device

Figure 1:
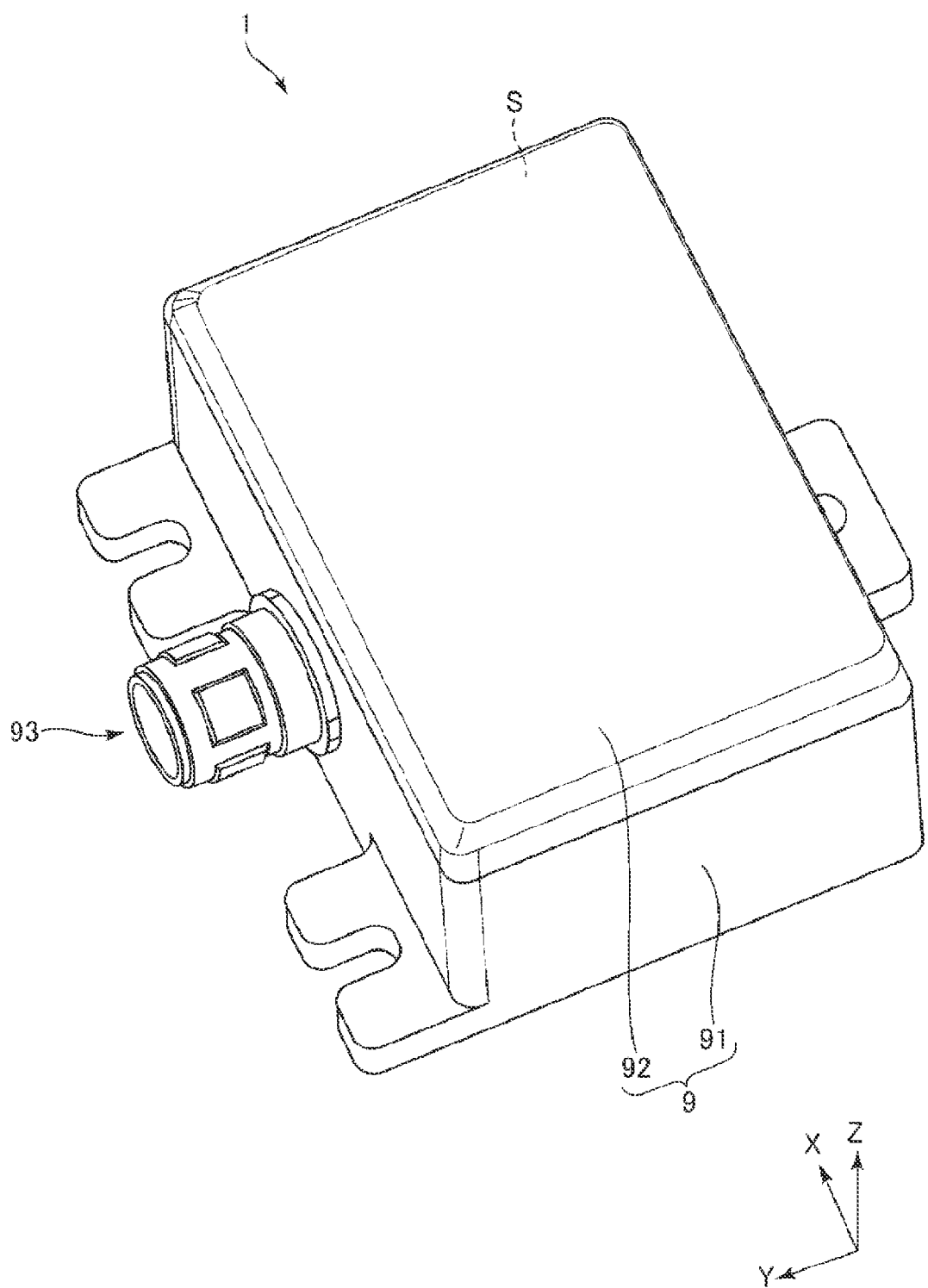
FIG. 1 is a perspective view of an inertial sensor device according to a first embodiment.
Figure 2:
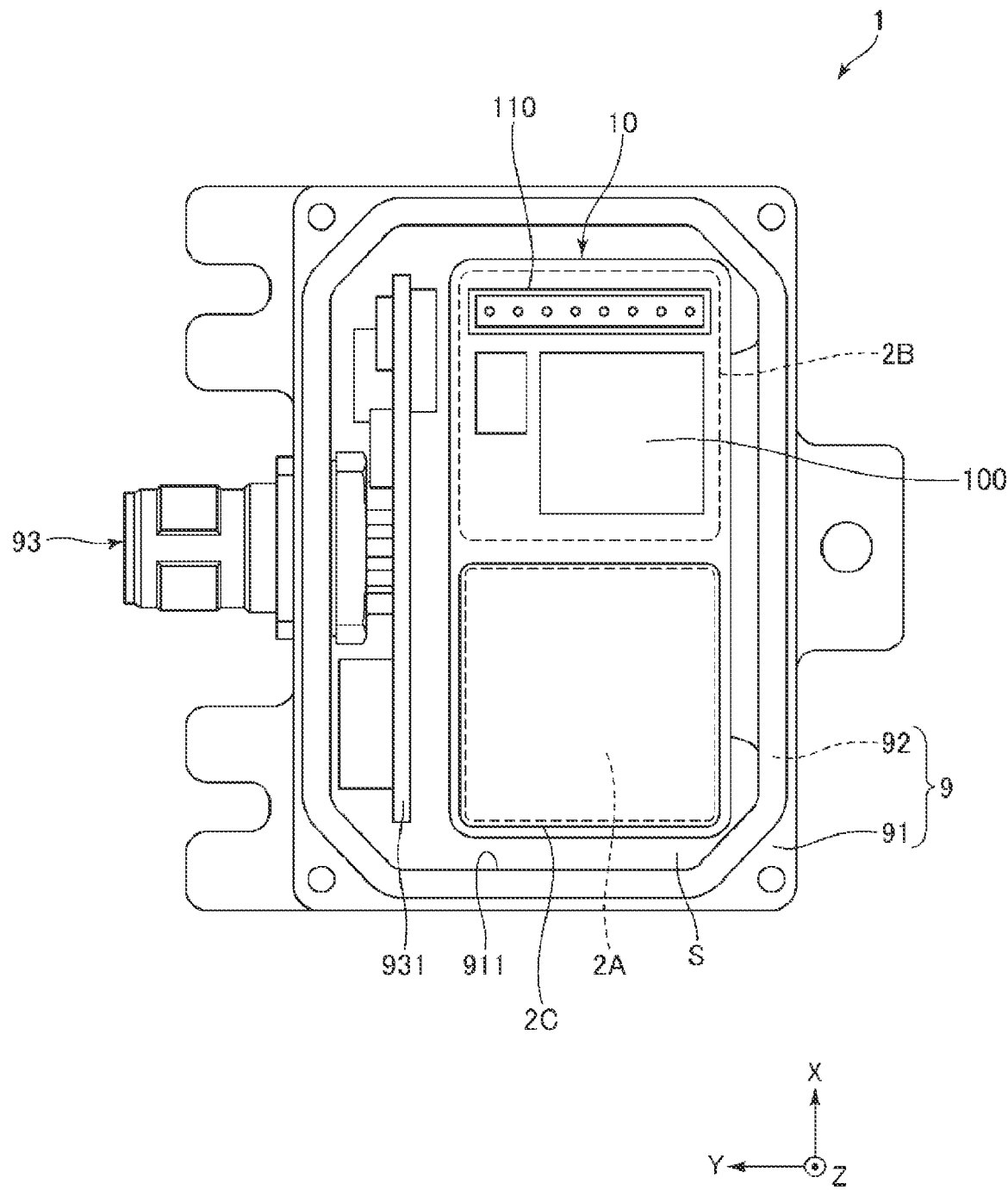
FIG. 2 is a transparent plan view of the inertial sensor device.
Figure 3:
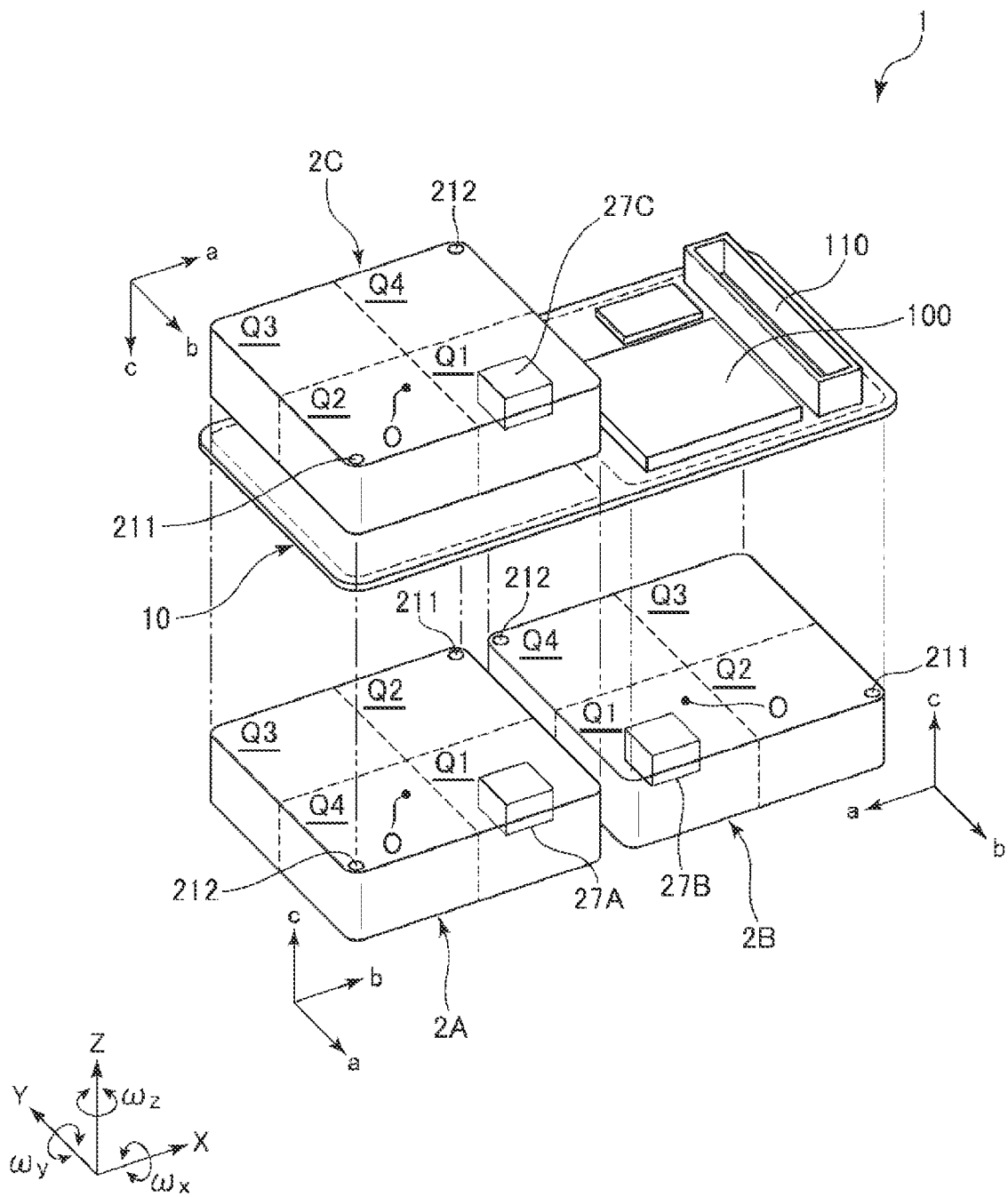
FIG. 3 is an exploded perspective view of the inertial sensor device.

FIG. 1 is a perspective view showing an outline of an inertial sensor device. FIG. 2 is a transparent plan view of the inertial sensor device. FIG. 3 is an exploded perspective view of an internal configuration of the inertial sensor device.

Hereinafter, embodiments of the present disclosure will be described with reference to the drawings. Each embodiment exemplifies a device and method for embodying the technical idea of the present disclosure. The technical idea of the present disclosure does not specify the materials, shapes, structures, arrangements, and the like of components to those described below. In the drawings, the same or similar elements are denoted by the same or similar reference numerals, and redundant description thereof will be omitted. The drawings are schematic and may be different from actual dimensions, relative ratios of dimensions, arrangements, structures, and the like.

As shown in FIGS. 1 to 3, an inertial sensor device 1 according to the embodiment includes, for example, a substrate 10, a first sensor module 2A, a second sensor module 2B, and a third sensor module 2C, which are mounted on the substrate 10, a processing circuit 100, and a container 9. The inertial sensor device 1 is a composite sensor module including a plurality of inertial sensors that detect accelerations in three axis directions and angular velocities around three axes. The inertial sensor device 1 detects, for example, motion states of a moving body such as a vehicle, a robot, or a drone, an electronic device such as a smartphone or a tablet terminal, and various other targets. The motion state includes a position, a posture, a speed, an acceleration, an angular velocity, and the like.

As shown in FIGS. 1 and 2, the container 9 includes a base 91 having a recess 911 opening upward, and a lid 92 fixed to the base 91 so as to close an opening of the recess 911. The container 9 has a substantially rectangular flat plate shape. The base 91 and the lid 92 define an accommodating space S inside the recess 911 sealed by the lid 92. The accommodating space S is a space for accommodating components such as the substrate 10, the first sensor module 2A, the second sensor module 2B, the third sensor module 2C, and the processing circuit 100. The container 9 protects the components accommodated in the accommodating space S from dust, moisture, ultraviolet light, impact, and the like.

The base 91 and the lid 92 may be made of aluminum (Al). In addition, for example, a metal material such as an Al alloy, zinc (Zn), and stainless steel, various ceramics, various resin materials, and a composite material thereof can be adopted as a material of each of the base 91 and the lid 92.

The inertial sensor device 1 includes a connector 93 attached to a side wall of the base 91, and a communication board 931 disposed in the accommodating space S. The connector 93 is a receptacle for electrical coupling between inside and outside of the container 9. The communication board 931 includes a circuit that processes communication between the inertial sensor device 1 and an external device.

The substrate 10 is a circuit board including various elements and wirings. The first sensor module 2A, the second sensor module 2B, the third sensor module 2C, the processing circuit 100, an internal connector 110, and the like are mounted on the substrate 10. The substrate 10 is fixed relative to, for example, the base 91.

As shown in FIGS. 2 and 3, the first sensor module 2A and the second sensor module 2B are arranged along an X axis on a lower surface of the substrate 10. The third sensor module 2C is disposed on an upper surface of the substrate 10 so as to overlap the first sensor module 2A when viewed from a direction along a Z axis. The processing circuit 100 and the internal connector 110 are disposed on the upper surface of the substrate 10 so as to overlap the second sensor module 2B when viewed from the direction along the Z axis. In this way, a size of the inertial sensor device 1 can be reduced by efficiently disposing various components with respect to an area of the substrate 10 and the accommodating space S.

The first sensor module 2A, the second sensor module 2B, and the third sensor module 2C are coupled to the processing circuit 100 via the substrate 10. The processing circuit 100 controls driving of the first sensor module 2A, the second sensor module 2B, and the third sensor module 2C. The processing circuit 100 is coupled to the communication board 931 via the internal connector 110 and a wiring (not shown) coupled to the internal connector 110.

The first sensor module 2A, the second sensor module 2B, and the third sensor module 2C have the same structure, for example. Hereinafter, any one of the first sensor module 2A, the second sensor module 2B, and the third sensor module 2C will be simply referred to as a "sensor module 2", and redundant description thereof will be omitted. The sensor module is also referred to as an inertial measurement module. The number of sensor modules 2 is not limited to three, and may be two or four or more.

Configuration of Sensor Module

Figure 4:
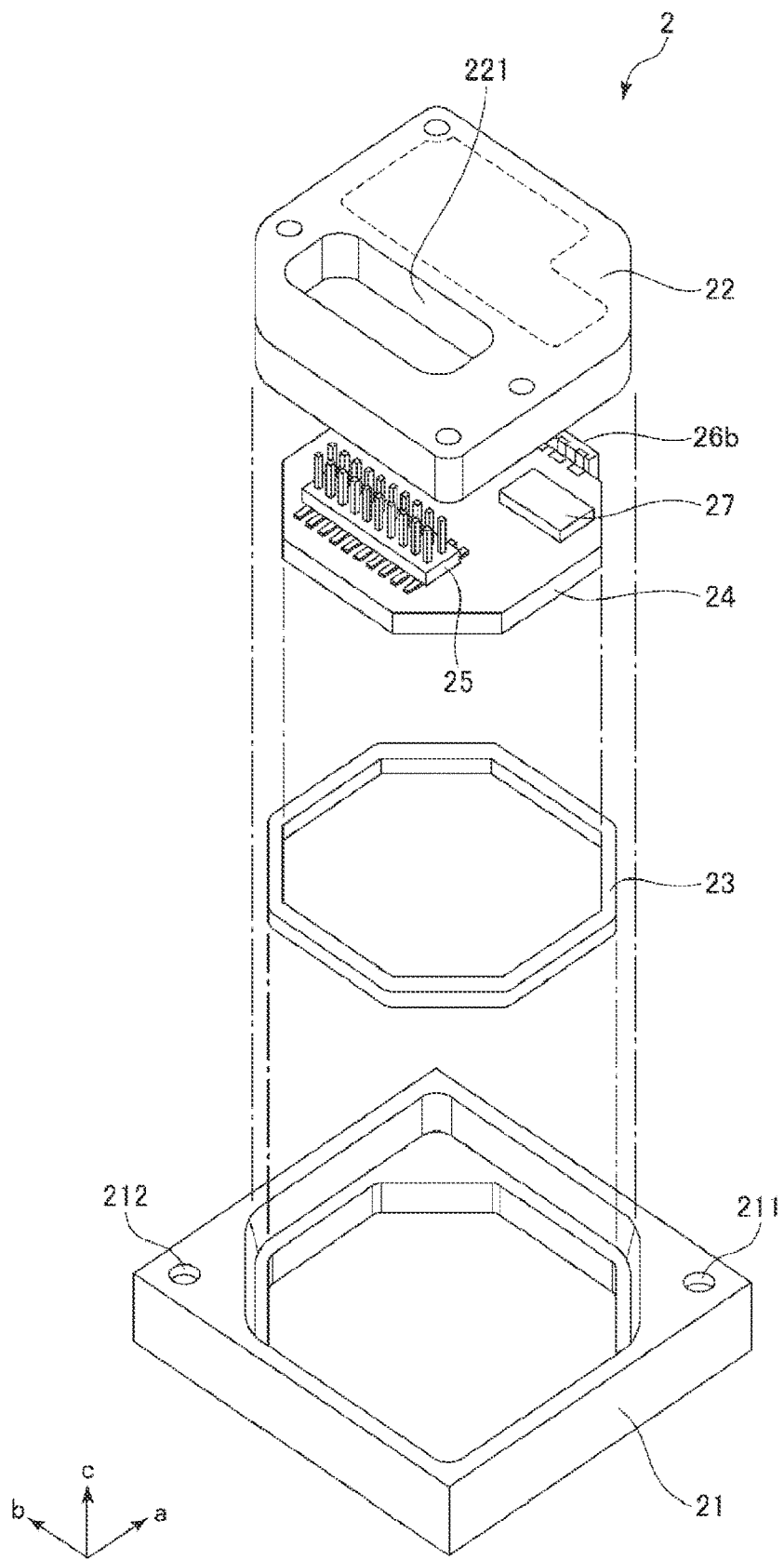
FIG. 4 is an exploded perspective view of a sensor module.
Figure 5:
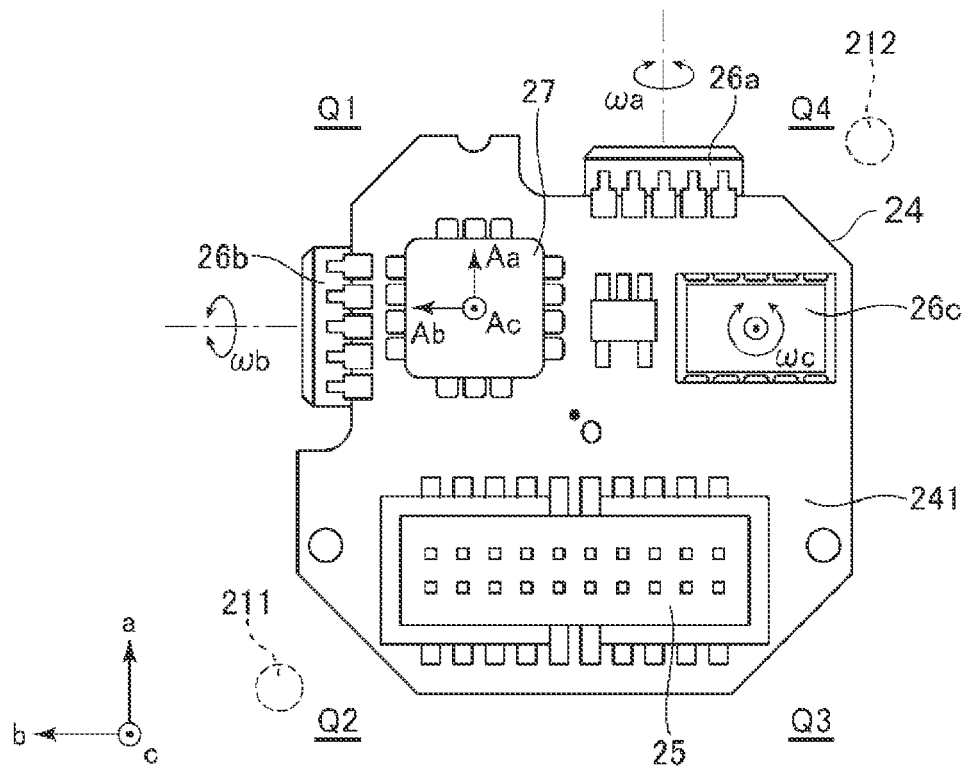
FIG. 5 is a front view of a circuit board.
Figure 6:
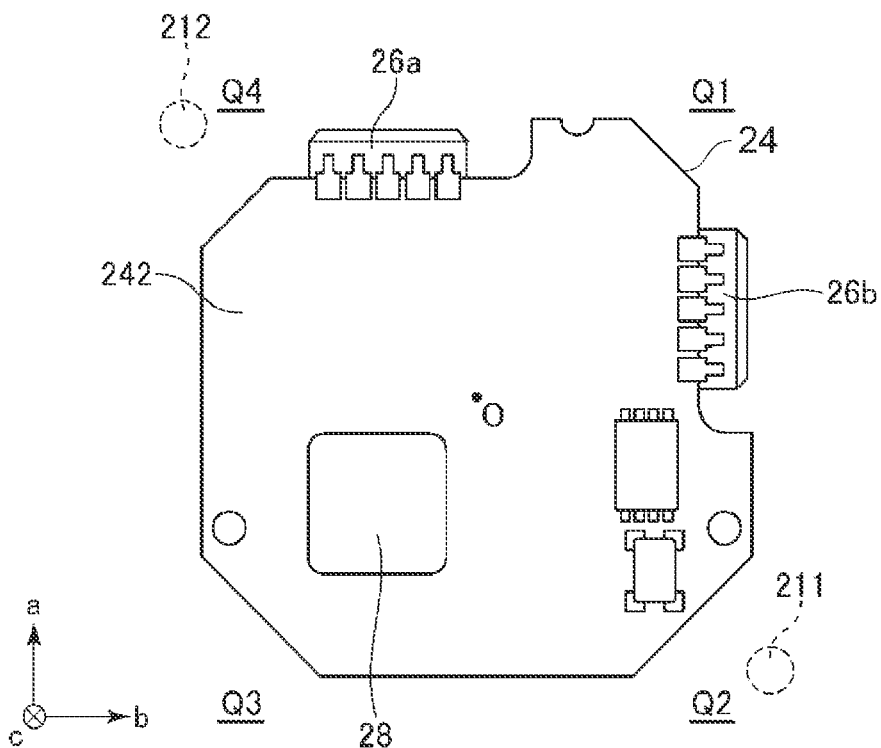
FIG. 6 is a rear view of the circuit board.

FIG. 4 is an exploded perspective view of the sensor module. FIG. 5 is a front view of the circuit board. FIG. 6 is a rear view of the circuit board.

As shown in FIG. 4, the sensor module 2 includes an outer case 21, an inner case 22, a joining member 23, and a circuit board 24. The outer case 21 has a recess into which the inner case 22 is inserted. The outer case 21 and the inner case 22 are joined to each other by the joining member 23 while accommodating and holding the circuit board 24. The sensor module 2 has a square shape when viewed from above, that is, from a direction along a c axis shown in FIG. 4. The outer case 21 has, for example, screw holes 211, 212 provided in a pair of corner portions located diagonally on an upper surface, respectively. The sensor module 2 can be fixed to the substrate 10 by being screwed using the screw holes 211, 212.

As shown in FIGS. 5 and 6, a module connector 25, a first angular velocity sensor 26a, a second angular velocity sensor 26b, a third angular velocity sensor 26c, an acceleration sensor 27, a signal processing unit 28, and the like are mounted on the circuit board 24. The module connector 25 couples the sensor module 2 to the substrate 10. The module connector 25 is exposed to the substrate 10 through, for example, an opening 221 provided in the inner case 22. The first angular velocity sensor 26a detects an angular velocity ωa around an a axis. The second angular velocity sensor 26b detects an angular velocity ωb around a b axis. The third angular velocity sensor 26c detects an angular velocity ωc around a c axis. The acceleration sensor 27 detects an acceleration Aa in a direction along the a axis, an acceleration Ab in a direction along the b axis, and an acceleration Ac in a direction along the c axis. Three detection axes, namely a, b, c axes are defined for each sensor module 2.

The signal processing unit 28 includes, for example, an integrated circuit (IC). The signal processing unit 28 is coupled to each of the first angular velocity sensor 26a, the second angular velocity sensor 26b, the third angular velocity sensor 26c, and the acceleration sensor 27 via the circuit board 24. The signal processing unit 28 is coupled to the processing circuit 100 via the circuit board 24, the module connector 25, the substrate 10, and the like.

The circuit board 24 has, for example, a square shape when viewed from the direction along the c axis. When four quadrants defined around a center O of the circuit board 24 are a first quadrant Q1, a second quadrant Q2, a third quadrant Q3, and a fourth quadrant Q4, the acceleration sensor 27 is disposed in the first quadrant Q1. As shown in FIG. 3, the first sensor module 2A, the second sensor module 2B, and the third sensor module 2C are disposed such that first quadrants Q1 thereof are close to each other.

That is, in an example shown in FIG. 3, an acceleration sensor 27A of the first sensor module 2A and an acceleration sensor 27C of the third sensor module 2C are disposed so as to overlap each other when viewed from the direction along the Z axis. The acceleration sensor 27A of the first sensor module 2A and an acceleration sensor 27B of the second sensor module 2B are disposed so as to overlap each other when viewed from a direction along the X axis. This can reduce a difference in acceleration received by each of the acceleration sensor 27A, the acceleration sensor 27B, and the acceleration sensor 27C.

The module connector 25 is disposed on an upper surface 241 of the circuit board 24 in the second quadrant Q2 and the third quadrant Q3. The first angular velocity sensor 26a is disposed on a side surface of the circuit board 24 in the fourth quadrant Q4. The second angular velocity sensor 26b is disposed on a side surface of the circuit board 24 in the first quadrant Q1. The third angular velocity sensor 26c is disposed on the upper surface 241 of the circuit board 24 in the fourth quadrant Q4. The acceleration sensor 27 is disposed on the upper surface 241 of the circuit board 24 in the first quadrant Q1. The signal processing unit 28 is disposed on a lower surface 242 of the circuit board 24 in the third quadrant Q3. The screw hole 211 is formed in the second quadrant Q2, and the screw hole 212 is formed in the fourth quadrant Q4.

Configuration of Sensor Module

Figure 7:
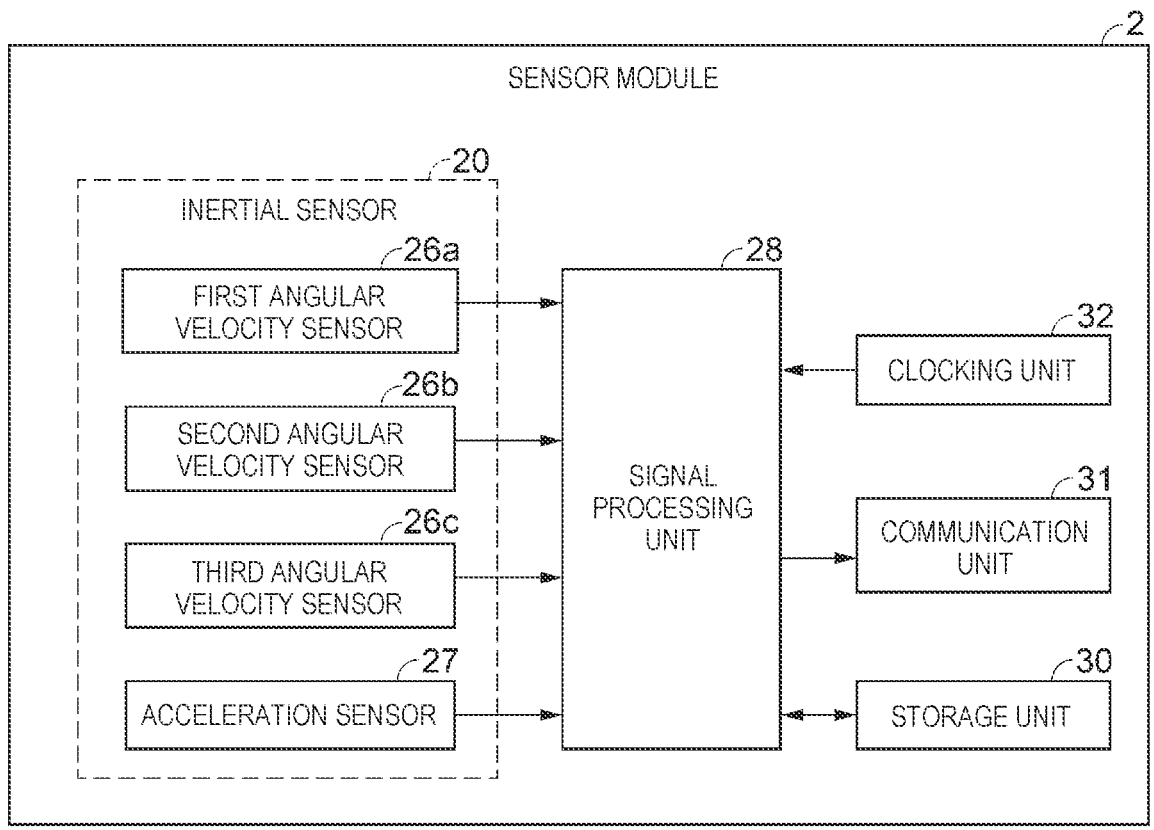
FIG. 7 is a circuit block diagram of the sensor module.

FIG. 7 is a block diagram showing a circuit configuration of the sensor module.

As shown in FIG. 7, the sensor module 2 includes an inertial sensor 20 including at least one of the first angular velocity sensor 26a, the second angular velocity sensor 26b, the third angular velocity sensor 26c, and the acceleration sensor 27, the signal processing unit 28, a clocking unit 32, a communication unit 31, and a storage unit 30. The communication unit 31 includes the module connector 25 (FIG. 5). The storage unit 30 stores various parameters and the like used for correction in the signal processing unit 28.

The inertial sensor 20 outputs a signal related to a plurality of detection axes to the signal processing unit 28. The signal processing unit 28 corrects the signal output from the inertial sensor 20 such that the plurality of detection axes are orthogonal to each other. For example, the plurality of detection axes forming a three-dimensional orthogonal coordinate system are set for each sensor module 2. In addition, the signal processing unit 28 corrects an offset error and a scale factor error included in the signal received from the inertial sensor 20.

Then, corrected inertial data is read to the processing circuit 100 of the inertial sensor device 1 (FIG. 10) at a timing synchronized with an output synchronization signal to be described later.

The clocking unit 32 is a timer circuit including a resonator such as a crystal resonator, and supplies a clock signal to the signal processing unit 28.

The communication unit 31 is a digital interface circuit, and enables bidirectional communication with the processing circuit 100 of the inertial sensor device 1 (FIG. 3) via the module connector 25 (FIG. 5).

Problems in Related Art

Figure 8:
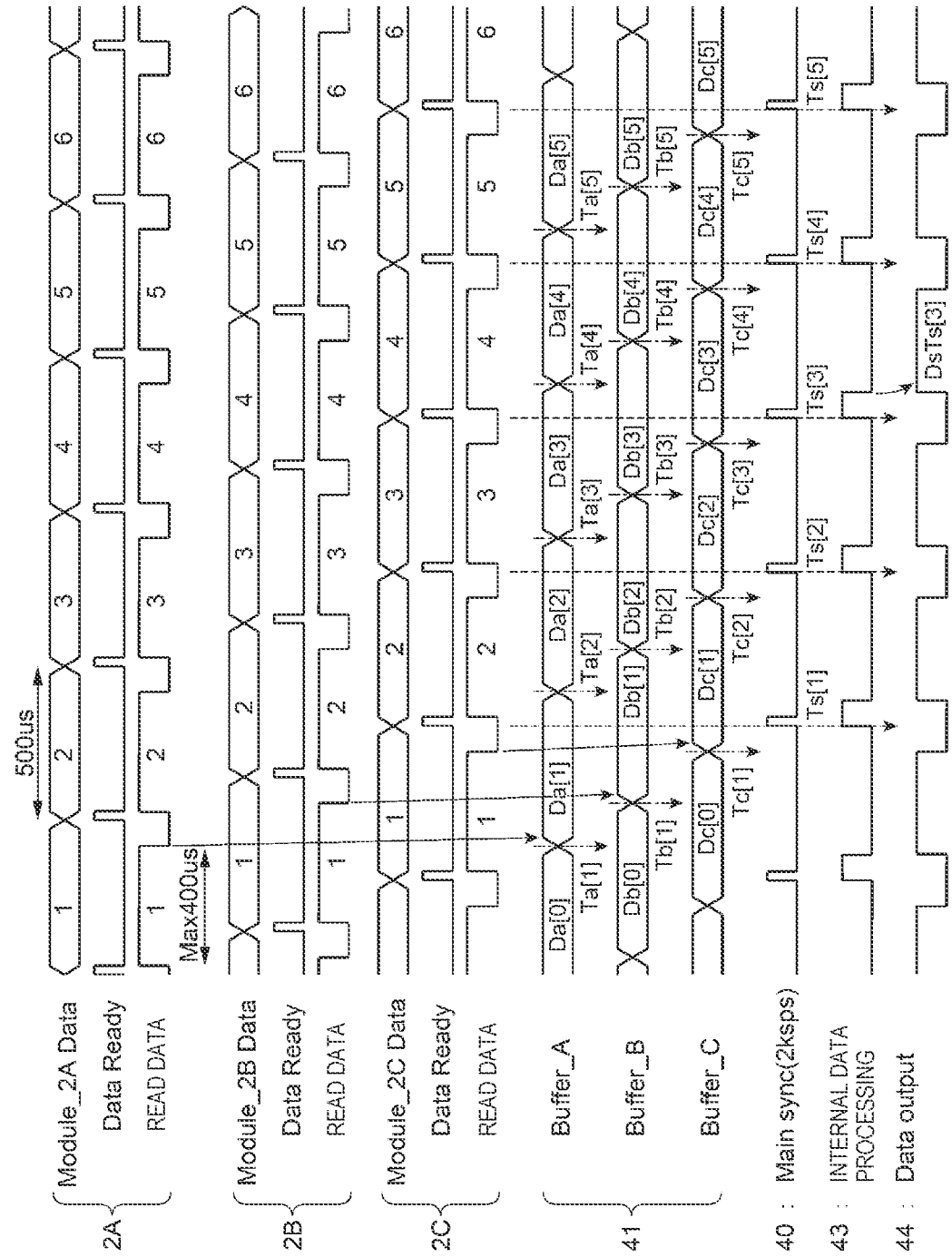
FIG. 8 is a timing chart showing a relationship between detection data and output data.

FIG. 8 is a timing chart showing a relationship between detection data and output data.

The uppermost part of FIG. 8 shows timings when reading inertial data in the first sensor module 2A.

First, the first sensor module 2A acquires inertial data at a timing of a clock in the own clocking unit 32. A sampling period is, for example, 2 kHz, but is not limited thereto, and may be, for example, 20 kHz. Next, an output synchronization signal (data ready) is output at a timing when the inertial data in one sampling is acquired. A data ready signal is synchronized with the sampling period.

Here, since each sensor module 2 includes its own clocking unit 32, the output synchronization signal is transmitted based on a clock of each sensor module 2. Specifically, the first sensor module 2A outputs the output synchronization signal at a timing of the clock in the own clocking unit 32. The same applies to the second sensor module 2B and the third sensor module 2C.

Figure 10:
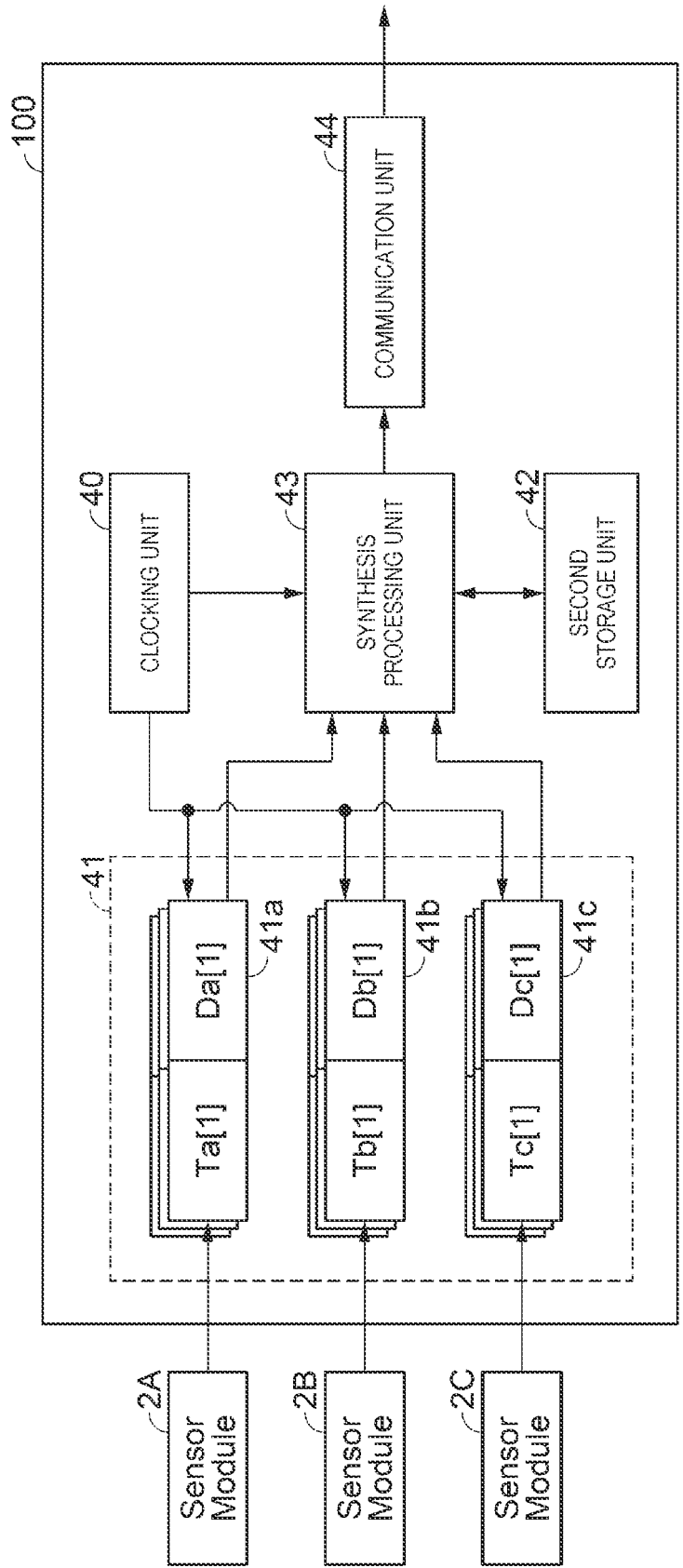
FIG. 10 is a circuit block diagram of a processing circuit in the inertial sensor device.

When receiving the output synchronization signal, the processing circuit 100 of the inertial sensor device 1 reads the inertial data from the first sensor module 2A in synchronization with the output synchronization signal, and stores the read inertial data as detection data Da[1] in a first storage unit 41 (FIG. 10). At this time, the detection data Da[1] and a read time point Ta[1] of the data are stored as a pair. The time point Ta[1] is a time point when reading the detection data Da[1] based on a clock of a clocking unit 40 of the processing circuit 100 (FIG. 10).

The same applies to the second sensor module 2B, and an output synchronization signal (data ready) is output at a timing of a clock in the clocking unit 32 of the second sensor module 2B. Then, inertial data is read in synchronization with the output synchronization signal, and detection data Db[1] and a time point Tb[1] are stored as a pair.

The same applies to the third sensor module 2C, and an output synchronization signal (data ready) is output at a timing of a clock in the clocking unit 32 of the third sensor module 2C. Then, inertial data is read in synchronization with the output synchronization signal, and detection data Dc[1] and a time point Tc[1] are stored as a pair.

Here, as shown in FIG. 8, the read time point Ta[1] of the detection data Da[1] from the first sensor module 2A and the read time point Tb[1] of the detection data Db[1] from the second sensor module 2B slightly deviate from each other. In other words, it can be seen that a deviation occurs on the time axis between the read time point Ta[1] and the read time point Tb[1]. Similarly, jitter also occurs between the read time point Ta[1] and the read time point Tc[1] and between the read time point Tb[1] and the read time point Tc[1]. This is because each sensor module 2 includes its own clocking unit 32 and outputs the output synchronization signal based on the time point.

Here, when output data at Ts[1] is simply generated from Da[1], Db[1], and Dc[1], a deviation from the time point Ts[1] occurs on the time axis, in other words, data having a jitter error is used, resulting in an error in the output data.

As an example, a difference between the detection data Da[1] from the first sensor module 2A and the detection data Db[1] from the second sensor module 2B, that is, a jitter error will be considered.

Figure 9:
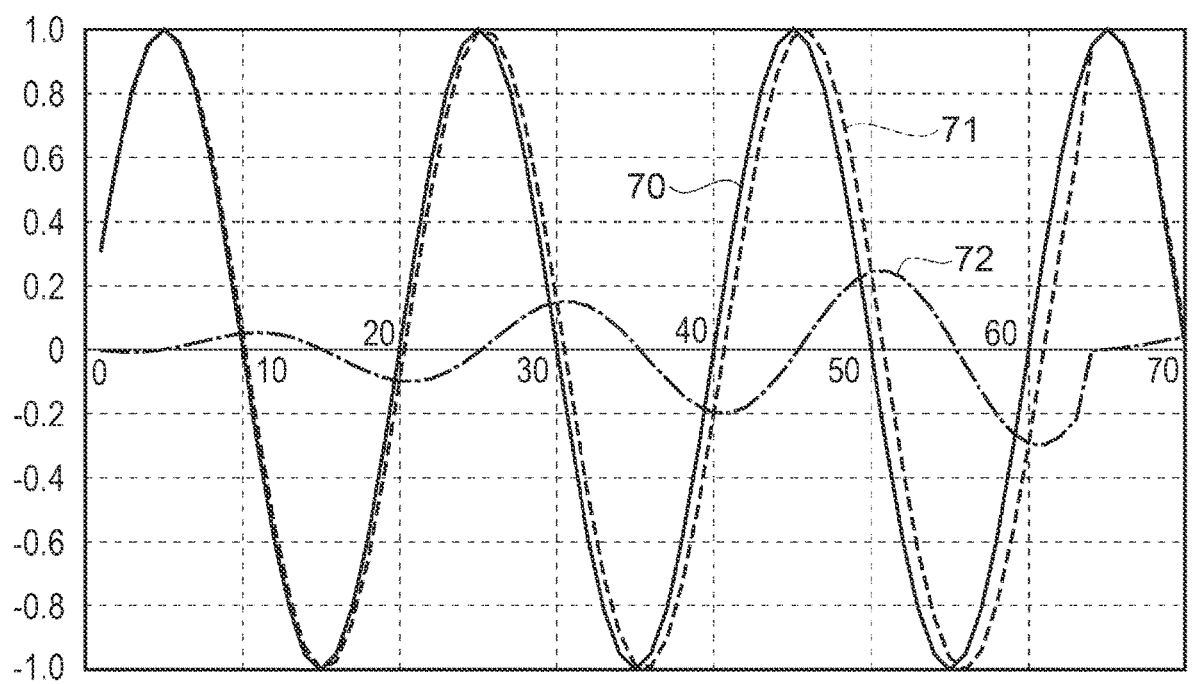
FIG. 9 is a waveform diagram showing an error due to jitter in detection data.

FIG. 9 is a waveform diagram showing detection data 70 from the first sensor module 2A and detection data 71 from the second sensor module 2B when the same sine wave of 100 Hz is input to the first sensor module 2A and the second sensor module 2B, and a difference between the detection data 70 and the detection data 71 (error waveform 72 of jitter error), in a case where there is a frequency difference between the clock of the first sensor module 2A and the clock of the second sensor module 2B. A horizontal axis represents time (sec), and a vertical axis represents a signal level.

The waveform diagram in FIG. 9 is based on a simulation result, and the simulation is performed using a program on a personal computer (PC).

The error waveform 72 shows a beat waveform that gradually increases while oscillating with time, then returns to zero, and increases while oscillating with time, reaching a maximum value of about 25%.

In a case where there is a frequency difference between the clock of the second sensor module 2B and the clock of the third sensor module 2C, a jitter error similarly occurs between detection data from the second sensor module 2B and detection data from the third sensor module 2C when the same sine wave of 100 Hz is input to the second sensor module 2B and the third sensor module 2C.

Therefore, it is obvious that an error occurs by simply synthesizing the detection data Da[1] from the first sensor module 2A, the detection data Db[1] from the second sensor module 2B, and the detection data Dc[1] from the third sensor module 2C.

Circuit Block Configuration of Processing Circuit in Inertial Sensor Device

FIG. 10 is a circuit block diagram of the processing circuit in the inertial sensor device.

As shown in FIG. 10, the processing circuit 100 of the inertial sensor device 1 includes the clocking unit 40, the first storage unit 41, a second storage unit 42, a synthesis processing unit 43, a communication unit 44, and the like.

The clocking unit 40 is a timer circuit including a resonator such as a crystal resonator, and supplies a clock signal and time point data to the synthesis processing unit 43, the first storage unit 41, and the like.

The first storage unit 41 is a buffer memory including a random access memory (RAM), and includes three storage areas 41a, 41b, 41c for each sensor module 2. The storage area 41a is a storage area for detection data Da[n] from the first sensor module 2A, and a read time point Ta[n] thereof, and stores the detection data Da[n] and the read time point Ta[n] as a detection data pair (Ta[1], Da[1]) in which both are linked. The storage area 41a ensures a storage area capable of storing a plurality of sets of detection data pairs in time series. For example, five sets of detection data pairs can be stored. The number of sets is not limited to five, and may be any number necessary for interpolation processing to be described later. The same applies to the storage areas 41b, 41c. In other words, the first storage unit 41 stores the detection data from each of the plurality of sensor modules 2 in association with a time point of the clocking unit 40.

The second storage unit 42 is a main memory including a read only memory (ROM) and a RAM, and stores a program to be executed by the synthesis processing unit 43, related data, and the like. The program includes an interpolation processing program and the like to be described later. The first storage unit 41 may be provided as a part of the second storage unit 42.

The synthesis processing unit 43 is a control unit of the processing circuit 100, and includes one or more processors. The synthesis processing unit 43 executes interpolation processing on the detection data from each sensor module 2 for synchronization, and synthesizes a plurality of pieces of interpolated detection data to generate output data. Details of the interpolation processing will be described later.

The communication unit 44 is an interface circuit, and outputs the output data from the synthesis processing unit 43 to an external device from the connector 93 via the internal connector 110 (FIG. 2) and the communication board 931.
Interpolation Processing-1 on Detection Data (Past Linear Interpolation)

Here, the interpolation processing on the detection data and a method for generating the output data by the synthesis processing unit 43 will be described with reference to FIGS. 8 and 10. Main sync in FIG. 8 indicates a reference signal Ts[n] at a reference clock (2 kHz) in the clocking unit 40 of the processing circuit 100.

In the present embodiment, the synthesis processing unit 43 obtains, using the latest two detection data pairs before a timing of a reference signal Ts[3], interpolation data at a timing of a previous reference signal Ts[2] by linear interpolation, for detection data from each sensor module 2. The timing of the reference signal Ts[3] corresponds to a predetermined time point.

Specifically, for a detection data pair (Ta[n], Da[n]) from the first sensor module 2A, linear interpolation calculation is performed using Equation (1) to obtain interpolation data DaTs[2] at the timing of the reference signal Ts[2]. Similarly, for the second sensor module 2B, interpolation data DbTs[2] is obtained using Equation (2), and for the third sensor module 2C, interpolation data DcTs[2] is obtained using Equation (3).

$$DaTs[2]=Da[2]+\{(Da[3]-Da[2])/(Ta[3]-Ta[2])\}*(Ts[2]-Ta[2]) \quad \text{Equation (1)}$$

$$DbTs[2]=Db[2]+\{(Db[3]-Db[2])/(Tb[3]-Tb[2])\}*(Ts[2]-Tb[2]) \quad \text{Equation (2)}$$

$$DcTs[2]=Dc[2]+\{(Dc[3]-Dc[2])/(Tc[3]-Tc[2])\}*(Ts[2]-Tc[2]) \quad \text{Equation (3)}$$

In Equation (1), a change amount is acquired from a difference between the detection data Da[3] and the previous detection data Da[2], and a slope is calculated by dividing the change amount by a difference between the read time point Ta[3] and the read time point Ta[2]. An error change amount on the time axis is derived by multiplying the slope by a difference between a time point of the reference signal Ts[2] and the read time point Ta[2]. Then, Da[2], which is a base value of the detection data, is added.

Accordingly, the interpolation data DaTs[2] at the timing of the reference signal Ts[2] is derived. The same applies to Equations (2) and (3). In other words, the synthesis processing unit 43 calculates the interpolation data by interpolating the detection data at two time points using Equations (1) to (3) that are linear function equations. The timing of the reference signal Ts[3] as the predetermined time point is a time point after the read time point Ta[2] and the read time point Ta[3] as the two time points.

Next, a method for synthesizing the interpolation data DaTs[2], the interpolation data DbTs[2], and the interpolation data DcTs[2] that are obtained by Equations (1) to (3) will be described.

The synthesis processing unit 43 synthesizes the three pieces of interpolation data using Equation (4) to generate output data DsTs[3].

$$DsTs[3]=(DaTs[2]+DbTs[2]+DcTs[2])/3 \quad \text{Equation (4)}$$

According to Equation (4), the synthesis processing unit 43 averages the interpolation data DaTs[2], the interpolation data DbTs[2], and the interpolation data DcTs[2] to generate the output data DsTs[3]. In other words, the synthesis processing unit 43 calculates interpolation data at a predetermined time point based on detection data from the first sensor module 2A at at least two time points, and synthesizes, using interpolation data for each of the plurality of sensor modules 2 including the interpolation data, output data at the predetermined time point.

As described above, according to the inertial sensor device 1 of the present embodiment, the following effects can be attained.

The inertial sensor device 1 is an inertial sensor device including a plurality of sensor modules 2 having a first sensor module 2A as a first inertial measurement module, and includes: the clocking unit 40; the first storage unit 41 as a storage unit that stores detection data from each of the plurality of sensor modules 2 in association with a time point of the clocking unit 40; and the synthesis processing unit 43 that calculates interpolation data at a predetermined time point based on detection data from the first sensor module 2A at at least two time points, and synthesizes, using interpolation data for each of the plurality of sensor modules 2 including the interpolation data, output data at the predetermined time point.

According to this, the interpolation data synchronized at the predetermined time point is calculated for each inertial measurement module. Then, the synthesis processing unit 43 obtains and synthesizes an average value of the plurality of pieces of interpolation data whose time axes are matched to generate output data. Therefore, by executing the interpolation processing on the plurality of pieces of detection data discrete due to digital output, matching in a time axis direction can be performed, and thus jitter noise that changes with time can be reduced. When N pieces of detection data are synthesized, random noise can be reduced to $1/\sqrt{N}$, and thus detection accuracy can be improved.

Therefore, it is possible to provide the inertial sensor device 1 capable of appropriately synthesizing the detection data from the plurality of inertial measurement modules and having high detection accuracy.

The synthesis processing unit 43 calculates the interpolation data by interpolating the detection data at the two time points using Equations (1) to (3) that are linear function equations.

According to this, since the interpolation data can be calculated by a simple linear function equation, a storage capacity of the second storage unit 42 related to the interpolation processing can be reduced, and a load of arithmetic processing in the synthesis processing unit 43 can also be reduced.

The timing of the reference signal Ts[3] as the predetermined time point is the time point after the read time point Ta[2] and the read time point Ta[3] as the two time points.

According to this, the interpolation data can be obtained by linear interpolation using two detection data pairs before the predetermined time point.

Second Embodiment

Interpolation Processing-2 on Detection Data (Past Secondary Interpolation)

In the above-described embodiment, the interpolation data is calculated by linearly interpolating the detection data at the two time points using the linear function equation, but the present disclosure is not limited to this method, and the interpolation data may be calculated by interpolating the detection data at n+1 or more time points using an n-th order function. Hereinafter, the same portions as those of the above-described embodiment are denoted by the same reference numerals, and redundant description thereof will be omitted.

In the present embodiment, the synthesis processing unit 43 obtains, using the latest three detection data pairs before a timing of the reference signal Ts[3], interpolation data at a timing of the previous reference signal Ts[2] by secondary interpolation, for detection data from each sensor module 2.

First, a basic equation for secondary interpolation is Equation (5).

$$Dn[y]=a1*(Tn[x])^2+b1*(Tn[x])+c1 \quad \text{Equation (5)}$$

Specifically, for the first sensor module 2A, the latest three detection data pairs (Ta[1], Da[1]), (Ta[2], Da[2]), and (Ta[3], Da[3]) in the past are substituted into Equation (5) to obtain Equations (6) to (8).

$$Da[1]=a1*(Ta[1])*(Ta[1])+b1*(Ta[1])+c1 \quad \text{Equation (6)}$$

$$Da[2]=a1*(Ta[2])*(Ta[2])+b1*(Ta[2])+c1 \quad \text{Equation (7)}$$

$$Da[3]=a1*(Ta[3])*(Ta[3])+b1*(Ta[3])+c1 \quad \text{Equation (8)}$$

Then, simultaneous equations, namely Equations (6) to (8) are solved to obtain coefficients a1, b1, c1.

Similarly, for the second sensor module 2B and the third sensor module 2C, the latest three detection data pairs in the past are substituted into Equation (5) to obtain Equations (9) to (11) and Equations (12) to (14).

$$Db[1]=a2*(Tb[1])*(Tb[1])+b2*(Tb[1])+c2 \quad \text{Equation (9)}$$

$$Db[2]=a2*(Tb[2])*(Tb[2])+b2*(Tb[2])+c2 \quad \text{Equation (10)}$$

$$Db[3]=a2*(Tb[3])*(Tb[3])+b2*(Tb[3])+c2 \quad \text{Equation (11)}$$

Then, simultaneous equations, namely Equations (9) to (11) are solved to obtain coefficients a2, b2, c2.

$$Dc[1]=a3*(Tc[1])*(Tc[1])+b3*(Tc[1])+c3 \quad \text{Equation (12)}$$

$$Dc[2]=a3*(Tc[2])*(Tc[2])+b3*(Tc[2])+c3 \quad \text{Equation (13)}$$

$$Dc[3]=a3*(Tc[3])*(Tc[3])+b3*(Tc[3])+c3 \quad \text{Equation (14)}$$

Then, simultaneous equations, namely Equations (12) to (14) are solved to obtain coefficients a3, b3, c3.

Next, the interpolation data DaTs[2], DbTs[2], DcTs[2] at the timing of the reference signal Ts[2] are obtained by the secondary interpolation using Equations (15) to (16). In other words, the synthesis processing unit 43 calculates the interpolation data by interpolating the detection data at three time points using a quadratic function.

$$DaTs[2]=a1*Ts[2]^2+b1*Ts[2]+c1 \quad \text{Equation (15)}$$

$$DbTs[2]=a2*Ts[2]^2+b2*Ts[2]+c2 \quad \text{Equation (16)}$$

$$DcTs[2]=a3*Ts[2]^2+b3*Ts[2]+c3 \quad \text{Equation (17)}$$

Next, a method for synthesizing the interpolation data DaTs[2], DbTs[2], DcTs[2] that are obtained by Equations (15) to (17) will be described.

The synthesis processing unit 43 synthesizes the three pieces of interpolation data using Equation (18) to generate output data.

$$DsTs[3]=(DaTs[2]+DbTs[2]+DcTs[2])/3 \quad \text{Equation (18)}$$

According to Equation (18), the synthesis processing unit 43 averages the interpolation data DaTs[2], the interpolation data DbTs[2], and the interpolation data DcTs[2] to generate the output data DsTs[3].

As described above, according to the inertial sensor device 1 of the present embodiment, the following effects can be attained in addition to the effects of the above-described embodiment.

The synthesis processing unit 43 calculates the interpolation data by interpolating the detection data at the three time points using the quadratic function. Specifically, the latest three detection data pairs in the past are substituted into Equation (5) to establish three simultaneous equations, the simultaneous equations are solved to obtain coefficients, and then the interpolation data at a timing of a reference signal immediately before a predetermined time point is calculated.

According to this, since the interpolation data is calculated by the secondary interpolation using a quadratic function equation, interpolation accuracy can be further improved. Therefore, jitter noise can be further reduced.

Therefore, it is possible to provide the inertial sensor device 1 capable of appropriately synthesizing the detection data from the plurality of inertial measurement modules and having high detection accuracy.

The synthesis processing unit 43 calculates the interpolation data by interpolating the detection data at n+1 or more time points using the n-th order function.

According to this, since the interpolation data is calculated by n-th order interpolation using an n-th order function equation, the interpolation accuracy can be further improved. Therefore, jitter noise can be further reduced.

Third Embodiment

Interpolation Processing-3 on Detection Data (Future Linear Interpolation)

In the first embodiment, the interpolation data at the timing of the reference signal Ts[2] immediately before the predetermined time point is obtained by the linear interpolation, and interpolation data at a timing of the predetermined time point may be obtained. Hereinafter, the same portions as those of the above-described embodiment are denoted by the same reference numerals, and redundant description thereof will be omitted.

In the present embodiment, the synthesis processing unit 43 obtains, using the latest two pieces of data in the past at the timing Ts[3] as a predetermined time point, interpolation data at the timing Ts[3] by linear interpolation.

Specifically, for the detection data pair (Ta[n], Da[n]) from the first sensor module 2A, linear interpolation calculation is performed using Equation (19) to obtain interpolation data DaTs[3] at the timing of the reference signal Ts[3]. Similarly, for the second sensor module 2B, interpolation data DbTs[3] is obtained using Equation (20), and for the third sensor module 2C, interpolation data DcTs[3] is obtained using Equation (21).

$$DaTs[3]=Da[3]+\{(Da[3]-Da[2])/(Ta[3]-Ta[2])\}*(Ts[3]-Ta[3]) \quad \text{Equation (19)}$$

$$DbTs[3]=Db[3]+\{(Db[3]-Db[2])/(Tb[3]-Tb[2])\}*(Ts[3]-Tb[3]) \quad \text{Equation (20)}$$

$$DcTs[3]=Dc[3]+\{(Dc[3]-Dc[2])/(Tc[3]-Tc[2])\}*(Ts[3]-Tc[3]) \quad \text{Equation (21)}$$

In Equation (19), a change amount is acquired from a difference between the detection data Da[3] and the previous detection data Da[2], and a slope is calculated by dividing the change amount by a difference between the read time point Ta[3] and the read time point Ta[2]. An error change amount on the time axis is derived by multiplying the slope by a difference between a time point of the reference signal Ts[3] and the read time point Ta[3]. Then, Da[3], which is a base value of the detection data, is added.

Accordingly, the interpolation data DaTs[3] at the timing of the reference signal Ts[3] is derived. The same applies to Equations (20) and (21).

Then, the three pieces of interpolation data obtained from Equations (19) to (21) are synthesized using Equation (22). Specifically, the synthesis processing unit 43 averages the three pieces of interpolation data to generate the output data DsTs[3].

$$DsTs[3]=(DaTs[3]+DbTs[3]+DcTs[3])/3 \quad \text{Equation (22)}$$

As described above, according to the inertial sensor device 1 of the present embodiment, the following effects can be attained in addition to the effects of the first embodiment.

The synthesis processing unit 43 obtains, using the latest two pieces of data in the past at the timing Ts[3] as the predetermined time point, the interpolation data at the timing Ts[3] by the linear interpolation.

According to this, the interpolation data at the timing Ts[3] as the predetermined time point can be derived without delay. Therefore, jitter noise can be reduced without delay.

Fourth Embodiment

Interpolation Processing-4 on Detection Data (Future Secondary Interpolation)

In the second embodiment, the interpolation data at the timing of the reference signal Ts[2] immediately before the predetermined time point is obtained by the secondary interpolation, and interpolation data at a timing of the predetermined time point may be obtained. Hereinafter, the same portions as those of the above-described embodiment are denoted by the same reference numerals, and redundant description thereof will be omitted.

In the present embodiment, the synthesis processing unit 43 obtains, using the latest three detection data pairs before a timing of the reference signal Ts[3], interpolation data at a timing of the reference signal Ts[3], which is a predetermined time point, by secondary interpolation. The above Equation (5) is used as a basic equation of the secondary interpolation.

First, processing from Equation (6) to Equation (14) is the same as that described in the second embodiment. Specifically, for each sensor module 2, the latest three detection data pairs in the past are substituted into Equation (5) to establish three simultaneous equations, and the simultaneous equations are solved to obtain three coefficients for each sensor module 2.

The present embodiment is different from the second embodiment in that the interpolation data DaTs[3], DbTs[3], DcTs[3] at the timing of the reference signal Ts[3] are obtained by the secondary interpolation using Equations (23) to (25).

$$DaTs[3]=a1*Ts[3]^2+b1*Ts[3]+c1 \quad \text{Equation (23)}$$

$$DbTs[3]=a2*Ts[3]^2+b2*Ts[3]+c2 \quad \text{Equation (24)}$$

$$DcTs[3]=a3*Ts[3]^2+b3*Ts[3]+c3 \quad \text{Equation (25)}$$

Next, the interpolation data DaTs[3], DbTs[3], DcTs[3] obtained by Equations (23) to (25) are synthesized using Equation (26) to generate the output data DsTs[3].

$$DsTs[3]=(DaTs[3]+DbTs[3]+DcTs[3])/3 \quad \text{Equation (26)}$$

According to Equation (26), the synthesis processing unit 43 averages the interpolation data DaTs[3], the interpolation data DbTs[3], and the interpolation data DcTs[3] to generate the output data DsTs[3].

As described above, according to the inertial sensor device 1 of the present embodiment, the following effects can be attained in addition to the effects of the second embodiment.

The synthesis processing unit 43 obtains, using the latest three pieces of data in the past at the timing Ts[3] as the predetermined time point, the interpolation data at the timing Ts[3] by the secondary interpolation.

According to this, the interpolation data at the timing Ts[3] as the predetermined time point can be derived without delay. Therefore, jitter noise can be reduced without delay.

Fifth Embodiment

Different Aspects of Inertial Sensor Device

Figure 11:
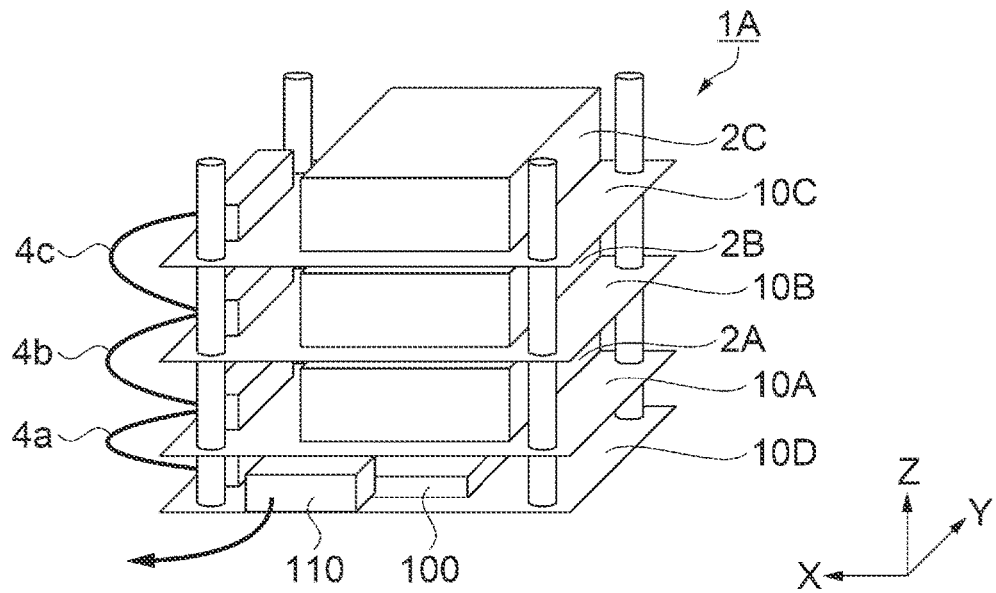
FIG. 11 is a perspective view showing a different aspect of the inertial sensor device.
Figure 12:
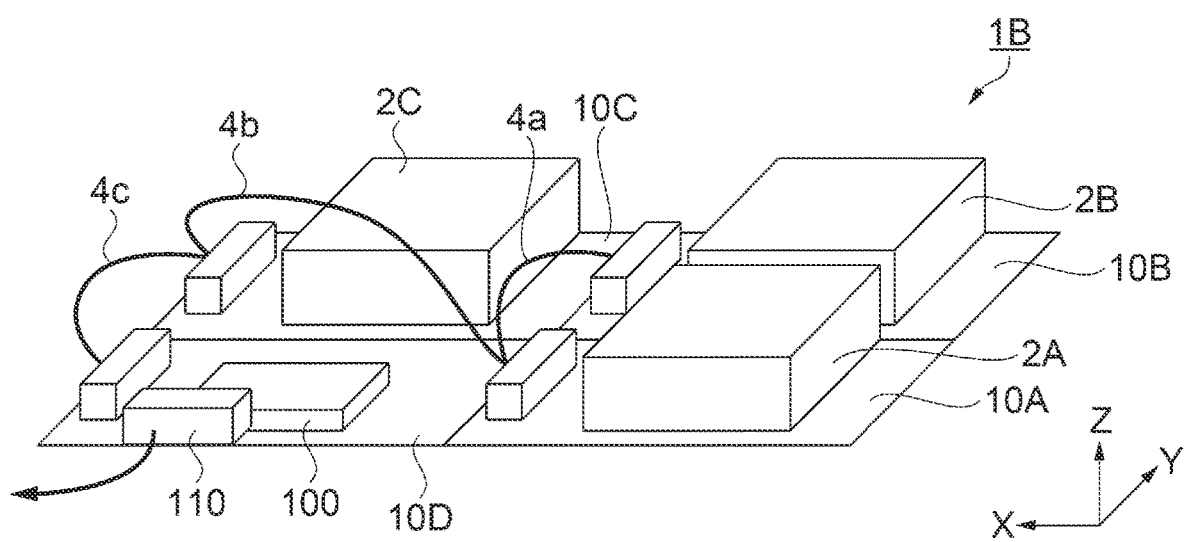
FIG. 12 is a perspective view showing a different aspect of the inertial sensor device.
Figure 13:
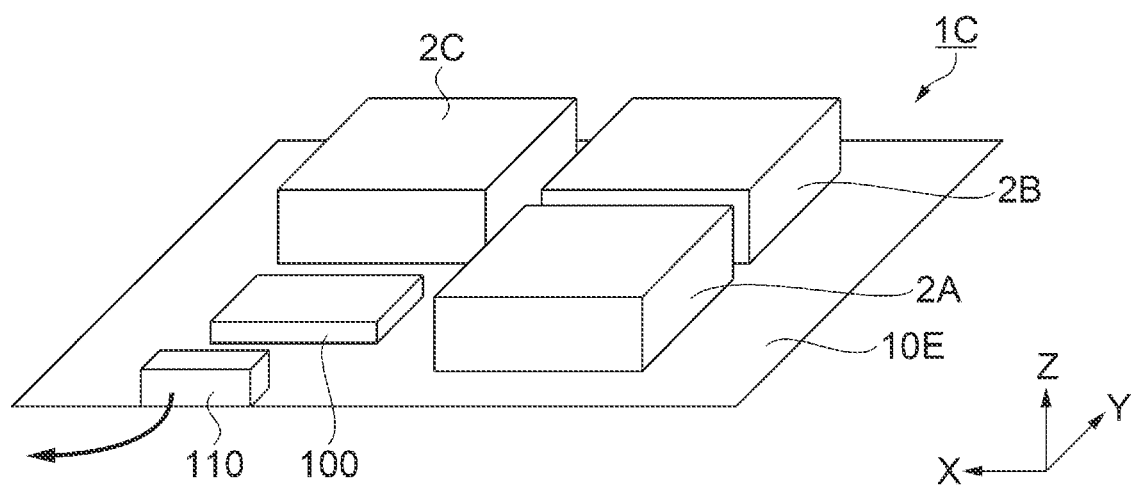
FIG. 13 is a perspective view showing a different aspect of the inertial sensor device.

FIG. 11 is a perspective view showing a different aspect of the inertial sensor device, corresponding to FIG. 3. FIG. 12 is a perspective view showing a different aspect of the inertial sensor device, corresponding to FIG. 3. FIG. 13 is a perspective view showing a different aspect of the inertial sensor device, corresponding to FIG. 3.

The inertial sensor device 1 is not limited to the aspect shown with reference to FIGS. 1 to 3, and may be a different aspect.

For example, as shown in FIG. 11, an inertial sensor device 1A according to the present embodiment includes the first sensor module 2A, the second sensor module 2B, and the third sensor module 2C, which are stacked in one direction, that is, a direction along the Z axis. The inertial sensor device 1A further includes four substrates 10A, 10B, 10C, 10D, and the processing circuit 100 and the internal connector 110 that are mounted on the substrate 10D. The substrates 10A to 10D are fixed relative to each other. The first sensor module 2A is mounted on the substrate 10A. The second sensor module 2B is mounted on the substrate 10B. The third sensor module 2C is mounted on the substrate 10C.

The first sensor module 2A, the second sensor module 2B, and the third sensor module 2C are coupled to the processing circuit 100 in a daisy chain by a plurality of cables 4a, 4b, 4c. The cables 4a, 4b, 4c couple the first sensor module 2A, the second sensor module 2B, the third sensor module 2C to the processing circuit 100 via connectors mounted on the substrates 10A, 10B, 10C, for example. In this way, coupling of the sensor modules 2 in series can improve a degree of freedom in design and easily increase the number of sensor modules. This can further improve an S/N ratio of an output signal.

As shown in FIG. 12, an inertial sensor device 1B according to the present embodiment includes the first sensor module 2A, the second sensor module 2B, and the third sensor module 2C, which are arranged on the same plane. The inertial sensor device 1B includes the substrates 10A to 10D arranged on one plane along an X-Y plane. As in the example shown in FIG. 11, the first sensor module 2A, the second sensor module 2B, and the third sensor module 2C are coupled to the processing circuit 100 in a daisy chain by the plurality of cables 4a, 4b, 4c. Therefore, a degree of freedom in design can be improved, and the number of sensor modules can be easily increased.

As shown in FIG. 13, an inertial sensor device 1C according to the present embodiment includes one substrate 10E instead of the plurality of substrates 10A to 10D arranged on the same plane. The first sensor module 2A, the second sensor module 2B, the third sensor module 2C, the processing circuit 100, and the internal connector 110 are mounted on the substrate 10E. The substrate 10E includes a wiring that couples the first sensor module 2A, the second sensor module 2B, and the third sensor module 2C to the processing circuit 100. The processing circuit 100 is coupled in parallel to each sensor module 2, for example. Accordingly, a communication capacity can be used more efficiently than in a case of serial wiring.

The inertial sensor devices LA, 1B, 1C, can also attain the same operational effects as those of the above-described embodiments.

What is claimed is:

1. An inertial sensor device including a plurality of inertial measurement modules, the inertial sensor device comprising:
    a clocking unit;
    a storage unit configured to store detection data from each of the plurality of inertial measurement modules in association with a time point of the clocking unit; and
    a synthesis processing unit configured to calculate interpolation data at a predetermined time point based on the detection data from each of the plurality of inertial measurement modules of at least two time points, and synthesize, using the interpolation data for each of the plurality of inertial measurement modules, output data at the predetermined time point.

2. The inertial sensor device according to claim 1, wherein the synthesis processing unit calculates the interpolation data by interpolating the detection data at n+1 or more time points using an n-th order function.

3. The inertial sensor device according to claim 1, wherein the synthesis processing unit calculates the interpolation data by interpolating the detection data at the two time points by a linear function.

4. The inertial sensor device according to claim 3, wherein the predetermined time point is a time point after the two time points.

5. The inertial sensor device according to claim 1, wherein the synthesis processing unit calculates the interpolation data by interpolating the detection data at three time points by a quadratic function.

6. An inertial sensor device including a plurality of inertial measurement modules having a first inertial measurement module, the inertial sensor device comprising:
    a clocking unit;
    a storage unit configured to store detection data from each of the plurality of inertial measurement modules in association with a time point of the clocking unit; and
    a synthesis processing unit configured to calculate interpolation data at a predetermined time point based on the detection data from the first inertial measurement module of at least two time points, and synthesize, using the interpolation data for the first inertial measurement module, output data at the predetermined time point.

* * * * *